(12) United States Patent
Bhowmik et al.

(10) Patent No.: US 9,582,046 B2
(45) Date of Patent: Feb. 28, 2017

(54) LOCKING HINGE ASSEMBLY FOR ELECTRONIC DEVICE

(75) Inventors: Achintya K. Bhowmik, Milpitas, CA (US); Russell S. Aoki, Tacoma, WA (US); Shmuel M. Eden, Santa Clara, CA (US); Rajiv K. Mongia, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 13/976,173

(22) PCT Filed: Dec. 28, 2011

(86) PCT No.: PCT/US2011/067510
§ 371 (c)(1),
(2), (4) Date: Nov. 21, 2013

(87) PCT Pub. No.: WO2013/100944
PCT Pub. Date: Jul. 4, 2013

(65) Prior Publication Data
US 2014/0098474 A1 Apr. 10, 2014

(51) Int. Cl.
*G06F 1/16* (2006.01)
*H04M 1/02* (2006.01)
*E05D 11/10* (2006.01)

(52) U.S. Cl.
CPC ........ *G06F 1/1681* (2013.01); *E05D 11/1078* (2013.01); *G06F 1/1616* (2013.01);
(Continued)

(58) Field of Classification Search
CPC ................... G06F 1/16; G06F 1/1681
(Continued)

(56) References Cited

U.S. PATENT DOCUMENTS 4,106,792 A * 8/1978 Schultz .................... B60D 5/00
280/432
5,243,475 A * 9/1993 Odashima ............ G11B 33/027
360/69

(Continued)

FOREIGN PATENT DOCUMENTS

CN 1713650 A 12/2005
JP 2004-348375 A 12/2004
(Continued)

OTHER PUBLICATIONS

International Preliminary Report on Patentability and Written Opinion received for PCT Patent Application No. PCT/US2011/067510, mailed on Jul. 10, 2014, 6 pages.
(Continued)

*Primary Examiner* — David Warren
(74) *Attorney, Agent, or Firm* — Alpine Technology Law Group LLC

(57) ABSTRACT

In one embodiment an electronic device comprises a housing having a first section and a second section comprising a display coupled to the first section by a hinge assembly, a rotation control assembly to control rotation of the hinge assembly, and a controller to activate the rotation control assembly in response to detection of a force condition at a second section of the housing of an electronic device. Other embodiments may be described.

18 Claims, 9 Drawing Sheets

(52) U.S. Cl.
CPC ........ *G06F 1/1679* (2013.01); *H04M 1/0216* (2013.01); *E05Y 2900/606* (2013.01); *Y10T 16/5403* (2015.01)

(58) Field of Classification Search
USPC .................................................... 361/679.01
See application file for complete search history.

(56) References Cited

U.S. PATENT DOCUMENTS

| | | | |
|---|---|---|---|
| 7,140,071 B2* | 11/2006 | Tonogai | H04M 1/0216 16/325 |
| 2004/0125552 A1 | 7/2004 | Song | |
| 2005/0288076 A1 | 12/2005 | Seol | |
| 2007/0054709 A1 | 3/2007 | Chuang | |
| 2009/0273899 A1 | 11/2009 | Boss et al. | |
| 2011/0271592 A1* | 11/2011 | Yamada | G11B 33/027 49/27 |
| 2013/0279301 A1* | 10/2013 | Takenawa | G04C 3/008 368/28 |
| 2014/0098474 A1* | 4/2014 | Bhowmik | G06F 1/1616 361/679.01 |
| 2015/0138713 A1* | 5/2015 | Onda | G06F 1/1679 361/679.27 |
| 2015/0372480 A1* | 12/2015 | Nagahama | H02H 7/0851 49/26 |
| 2016/0109931 A1* | 4/2016 | Kobayashi | G06F 1/3265 345/212 |

FOREIGN PATENT DOCUMENTS

| | | |
|---|---|---|
| JP | 2007-201653 A | 8/2007 |
| JP | 5278943 B2 | 9/2013 |
| TW | M466461 B | 12/2001 |
| TW | 200413886 A | 8/2004 |
| TW | 2005-24372 A | 7/2005 |
| TW | M282466 U | 12/2005 |
| TW | I252667 B | 4/2006 |
| TW | 201342016 A | 10/2013 |
| WO | 2013/100944 A1 | 7/2013 |

OTHER PUBLICATIONS

Office Action received for Japanese Patent Application No. 2014-545878 mailed on May 19, 2015, 6 pages including 3 pages of English translation.
International Search Report and Written Opinion received for PCT Application No. PCT/US2011/067510, mailed on Sep. 5, 2012, 9 pages.
Office Action received for Taiwanese Patent Application No. 101149782, mailed on Sep. 7, 2015, 9 pages including 4 pages of English translation.
Notice of Allowance received for Japanese Patent Application No. 2014-545878, mailed on Jan. 26, 2016, 3 pages of Notice of Allowance and 6 pages of English translation of allowed claims.
Notice of Allowance received for Taiwanese Patent Application No. 101149782, mailed on Jan. 25, 2016, 2 pages of Notice of Allowance and 7 pages of English translation of allowed claims.
Office Action received for Chinese Patent Application No. 201180075947.3, mailed on Dec. 15, 2016, 6 pages.

* cited by examiner

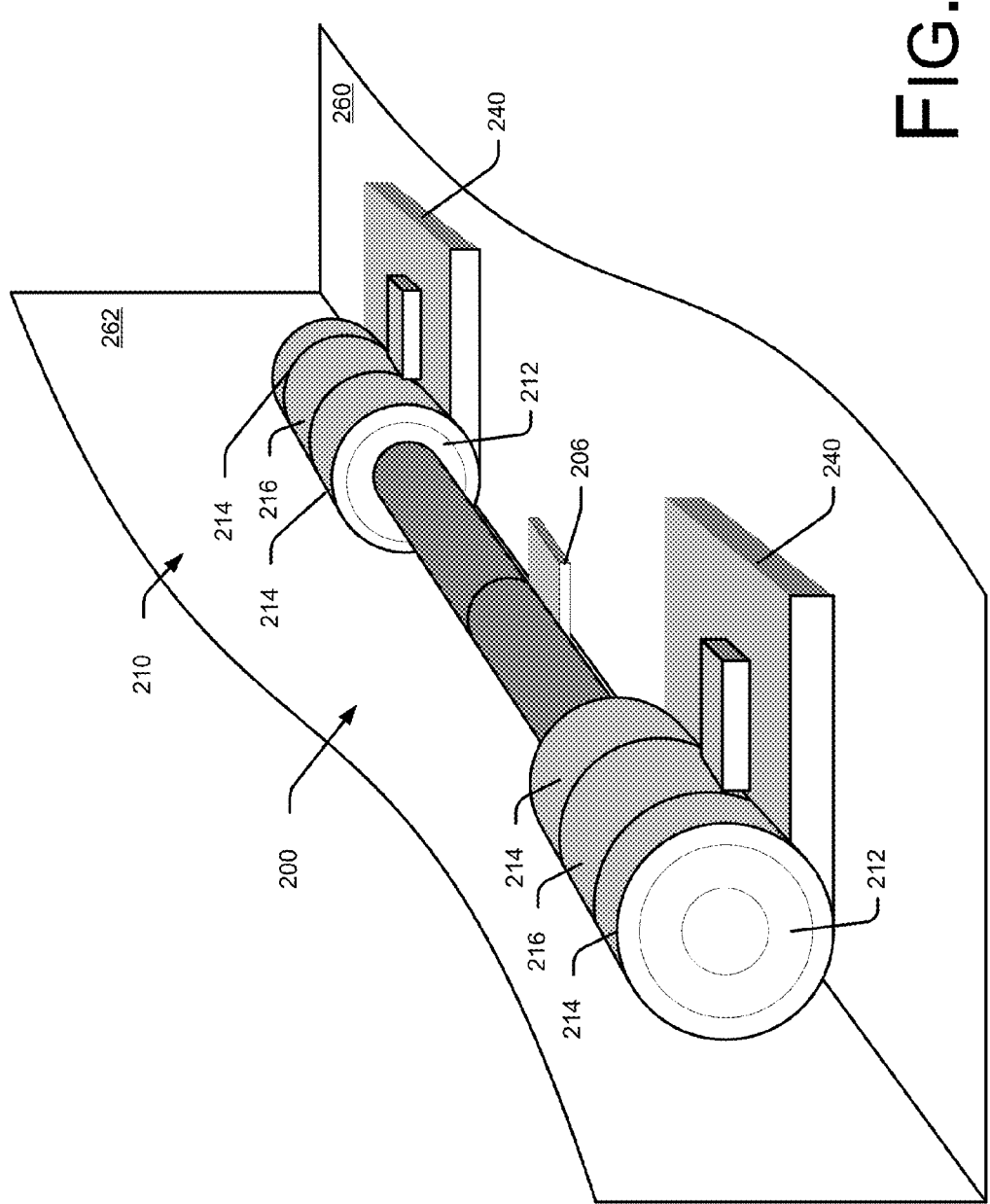

LOCKING HINGE ASSEMBLY FOR ELECTRONIC DEVICE

BACKGROUND

The subject matter described herein relates generally to the field of electronic devices and more particularly to a locking hinge assembly for one or more electronic devices.

Some electronic devices utilize a "clamshell" housing. By way of example, many laptop computers and mobile electronic devices utilize a clamshell housing in which a keyboard is disposed on a first section and a display is disposed on a second section coupled to the first section by a hinge. Alternatively, a "clamshell" can consist of displays, one on a first section that can also be utilized as a touch keyboard and one display on a second section coupled to the first section by a hinge.

Touch screen operation is becoming increasingly common with mobile devices. In some instances touch screen operations may cause the display to rotate due to the force applied to the screen during touch screen operations. Accordingly assemblies to lock, or at least to inhibit the rotation of a display on a clamshell housing may find utility.

BRIEF DESCRIPTION OF THE DRAWINGS

The detailed description is described with reference to the accompanying figures.

FIG. 2 is a schematic, perspective view illustration of a hinge assembly in accordance with some embodiments.

DETAILED DESCRIPTION

Described herein are exemplary systems and methods to lock, or at least to inhibit the rotation of a display on a clamshell housing. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
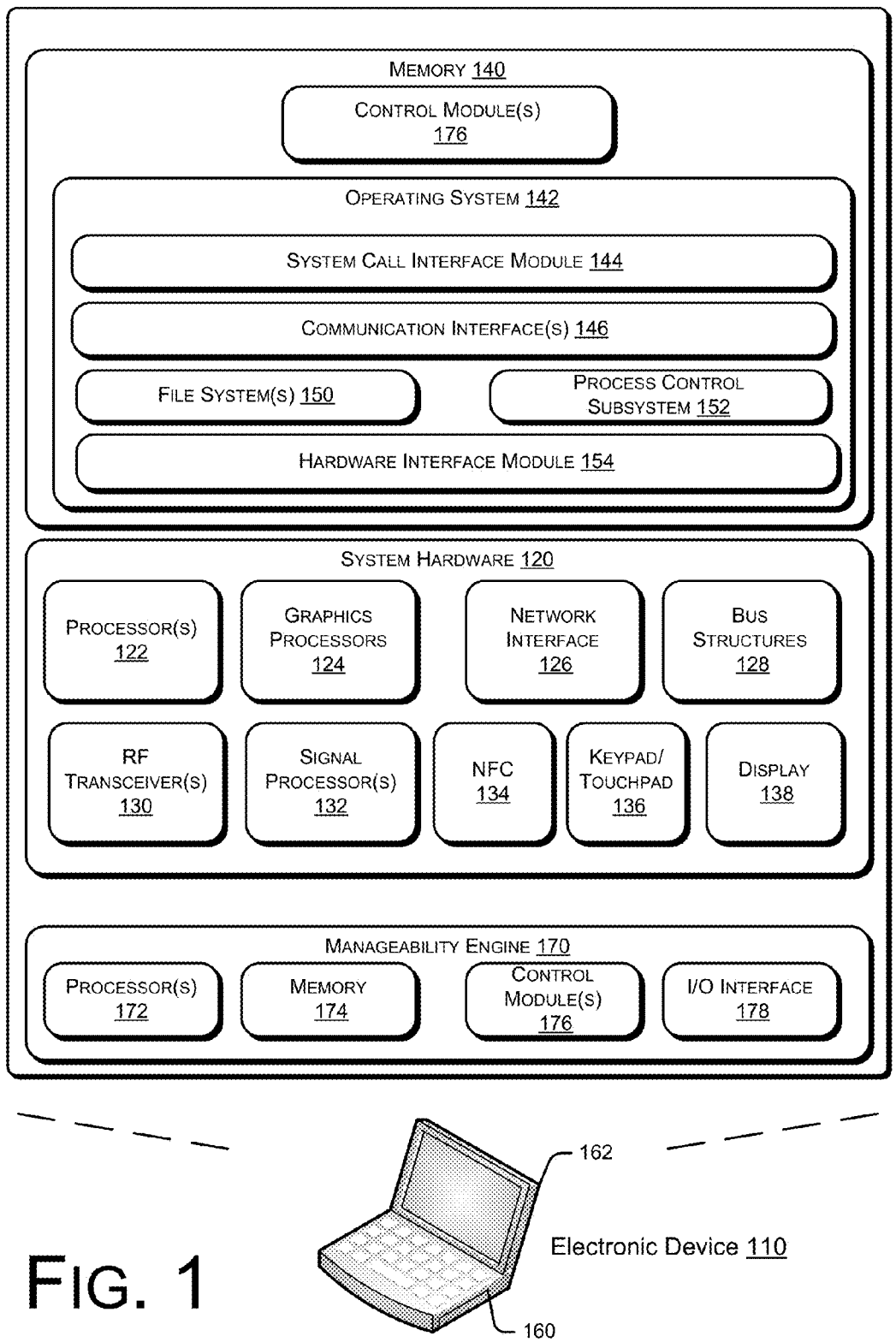
FIG. 1 is a schematic illustration of an exemplary electronic device which may be modified to include a locking hinge assembly in accordance with some embodiments.

FIG. 1 is a schematic illustration of an exemplary electronic device 110 which may be adapted to include systems and methods to lock, or at least to inhibit the rotation of a display on a clamshell housing having a first section 160 and a second section 162 in accordance with some embodiments.

As illustrated in FIG. 1, electronic device 110 may be embodied as a conventional mobile device such as a laptop computer, a mobile phone, tablet computer portable computer, or personal digital assistant (PDA). The particular device configuration is not critical.

In various embodiments, electronic device 110 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 110 to receive input from a user.

The electronic device 110 includes system hardware 120 and memory 140, which may be implemented as random access memory and/or read-only memory. A file store may be communicatively coupled to computing device 110. The file store may be internal to computing device 110 such as, e.g., eMMC, SSD, one or more hard drives, or other types of storage devices. File store 180 may also be external to computer 110 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 110 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/ GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 110 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 110 may further include one or more input/output interfaces such as, e.g., a keypad 136 and a display 138. In some embodiments electronic device 110 may not have a keypad and use the touch panel for input.

Memory 140 may include an operating system 142 for managing operations of computing device 110. In one embodiment, operating system 142 includes a hardware interface module 154 that provides an interface to system hardware 120. In addition, operating system 140 may include a file system 150 that manages files used in the operation of computing device 110 and a process control subsystem 152 that manages processes executing on computing device 110.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some embodiments an electronic device may include a manageability engine 170, which may comprise one or more controllers that are separate from the primary execution environment. The separation may be physical in the sense that the manageability engine may be implemented in controllers which are physically separate from the main processors. Alternatively, the trusted execution environment may logical in the sense that the manageability engine may be hosted on same chip or chipset that hosts the main processors.

By way of example, in some embodiments the manageability engine 170 may be implemented as an independent integrated circuit located on the motherboard of the electronic device 110, e.g., as a dedicated processor block on the same SOC die. In other embodiments the trusted execution engine may be implemented on a portion of the processor(s) 122 that is segregated from the rest of the processor(s) using hardware enforced mechanisms In the embodiment depicted in FIG. 1 the manageability engine 170 comprises a processor 172, a memory module 174, a control module 176, and an I/O interface 178. In some embodiments the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the manageability engine 170 is separate from the main processor(s) 122 and operating system 142, the manageability engine 170 may be made secure, i.e., inaccessible to hackers who typically mount software attacks from the host processor 122.

In some embodiments the electronic device 100 may comprise a locking assembly which locks, or at least to inhibit the rotation of a display on a clamshell housing of the electronic device 100. In some embodiments, the locking assembly consists of a locking hinge assembly. In brief summary, a locking hinge summary comprises a hinge assembly mountable to a first section of a housing of an electronic device 110, a rotation control assembly to control rotation of the hinge assembly, and a controller to activate the rotation control assembly in response to detecting a condition whereby it is desired that the second section of the housing of an electronic device be locked relative to the first section of the housing of the electronic device. In some embodiments, the condition consists of detection of the proximity of the user to the second section of the housing. In some embodiments, the condition consists of detection of a touch signal to the second section of the housing. By way of example, in some embodiments the controller may be implemented by a control module 176 depicted in FIG. 1. Thus, in some embodiments the controller may be implemented as software resident in the memory 140 of the device or which operates on the processor(s) 122 of the device 110, or resident in the memory 174 and which operates on the processor(s) 172 of the manageability engine 170. In alternate embodiments the controller may be reduced to firmware or to hardwired logic in dedicated circuitry. The particular implementation of the logic is not critical.

Embodiments of a locking hinge assembly will be described with reference to FIG. 2 and FIGS. 3A-5C. FIG. 2 is a schematic, perspective view illustration an exemplary hinge assembly 200 which may be used in a clamshell housing of an electronic device, in accordance with some embodiments. Referring to FIG. 2, in some embodiments a hinge assembly 200 comprises at least one hinge pin assembly 210 mountable to a first section 260 of a housing of the electronic device 100. In the embodiment depicted in FIG. 2 the hinge pin assembly 210 comprises a pin 212 rotatable about a longitudinal axis between a first position and a second position and a connectable to a first section 260 of the housing and a second section 262 of the housing. In some embodiments the first section 260 may correspond to the base of an electronic device, while the second section 262 may correspond to the display of an electronic device.

The hinge pin assembly 210 may be mounted to the first section 260 of the housing by a base plate 240. The base plate 240 may be formed from a suitable metal or polymeric material and secured to the first section 160 of the housing using an adhesive or by suitable fasteners, e.g., by set screws, rivets, or the like. The particular technique of securing the base plate 240 to the first section 160 of the housing is not critical.

The hinge pin assembly 210 may be implemented as a multi-part component and comprises a bearing section 214 to support the pin 212. The pin 212 is able to rotate about its longitudinal axis within the bearing section 214. A brake section 216 serves to limit the free angular rotation of the pin within the bearing section 214, but allows the pin to rotate further by overcoming a friction force in order to adjust the relative position of the sections of the housing. The bearing section 214 extends on both sides of the brake section 216. The bearing section 214 and the brake section 216 define a shaft into which the pin 212 is place.

Having described details of the construction of a hinge assembly 200, attention will now be turned to describing embodiments of the rotation control assembly and their operation in conjunction with controller. In some embodiments the rotation control assembly may be mounted onto or otherwise integrated with portions of the hinge assembly 200. In various embodiments the rotation control assemblies serve to lock, or at least to inhibit the rotation of a display on a clamshell housing in accordance with some embodiments.

Figure 3A:
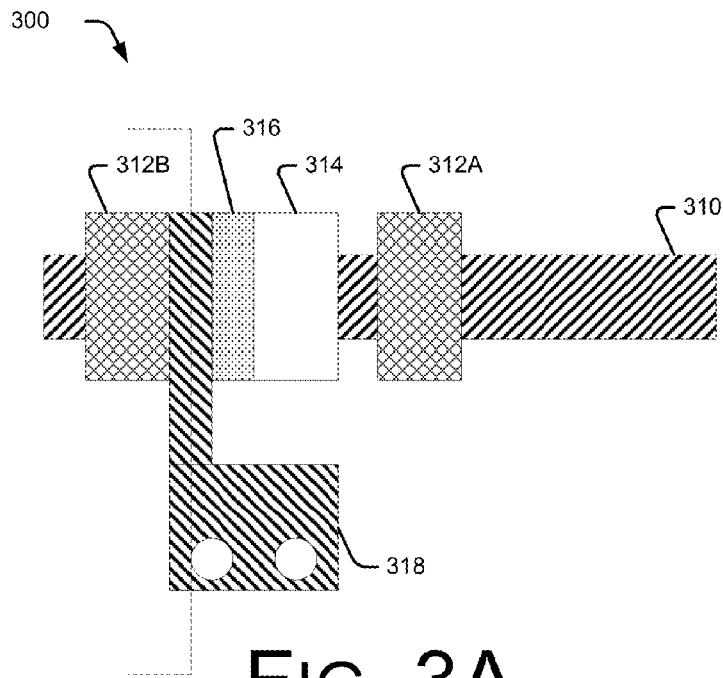
FIGS. 3A and 3C are schematic, top views
Figure 3B:
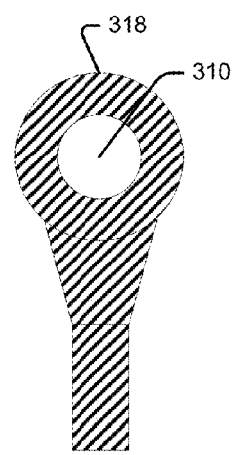
FIGS. 3B and 3D are schematic, cross-sectional views of a hinge locking assembly in accordance with some embodiments.
Figure 3C:
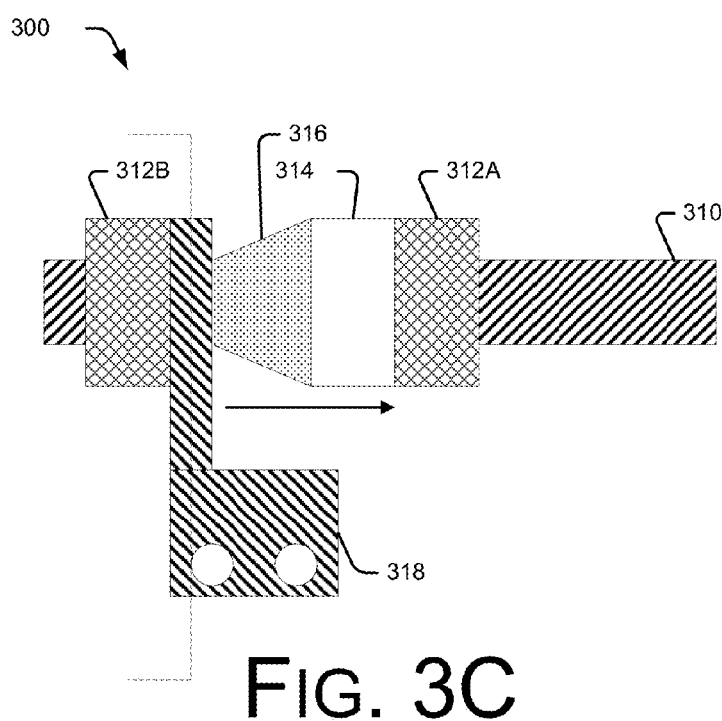

A first embodiment of a rotation control assembly 300 is described with reference to FIGS. 3A-3D. Referring first to FIG. 3A, a rotation control assembly 300 may comprise a brake 314 and a piezoelectric disk 316 mounted on a hinge pin 310. The brake 314 may be mounted proximate a first collar 312a and the piezoelectric disk 316 may be mounted adjacent the brake 314. Piezoelectric disk 316 may be coupled to a power source, the output of which may be regulated by one or more of the control modules 176 which execute on the electronic device. A mounting bracket 318 may be mounted proximate a second collar 312B. The mounting bracket 318 may be used to secure the hinge assembly to a base of an electronic device, as described above.

Figure 6:
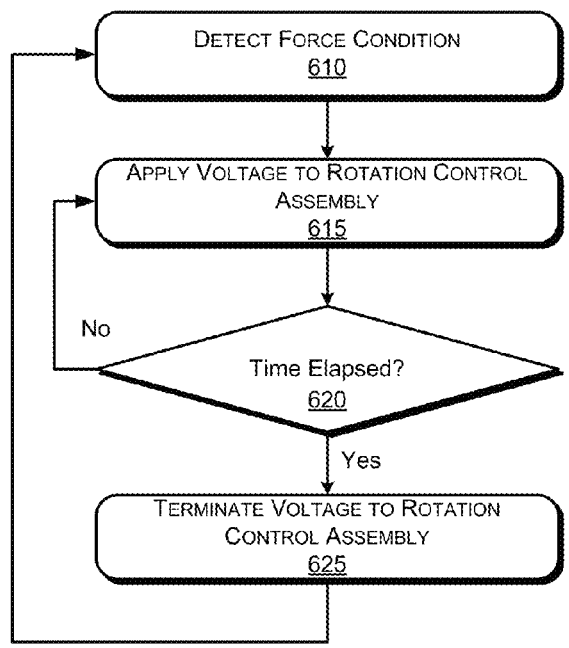
FIG. 6 is a flowchart illustrating operations of a controller in a method to operate a hinge locking assembly in accordance with some embodiments.

Operation of the rotation control assembly 300 will be explained with reference to FIGS. 3A-3D and FIG. 6. FIG. 3A depicts the configuration of the rotation control assembly 300 in an unactuated state in which the brake 314 is displaced from the collar 312A, thereby allowing the hinge assembly to move freely. Referring to FIG. 6, in operation the controller 176 detects (operation 610) a condition proximate the second section 162 of the electronic device 110. As used herein the phrase "force condition" should be construed to include conditions in which a force is being applied to the second section 162 of the electronic device, e.g., such as by a user pressing on a touch screen of the second section 162 of the electronic device 110. In such an embodiment the control module 176 may detect an input to the touch screen. However, in alternate embodiments various input/output devices may be used to detect, or to anticipate, a force being applied to the second section 162 of the electronic device 110. By way of example in some embodiments a strain gauge or other force measurement device may be incorporated into the electronic device to detect the application of forces to the second section 162. In alternate embodiments, the touch screen sensor may be used to detect an object approaching the second section 162 of the electronic device 110. In alternate embodiments a camera or other input device may detect an object approaching the second section 162 of the electronic device 110 and may generate a signal in response thereto, which signal may be forwarded to the control module 176. Thus, as used herein the phrase "force condition" should be construed to include conditions where an actual force is applied to the second section 162 of the electronic device 110 or conditions which anticipate a force to be applied to the second section 162 of the electronic device 110.

Figure 3D:
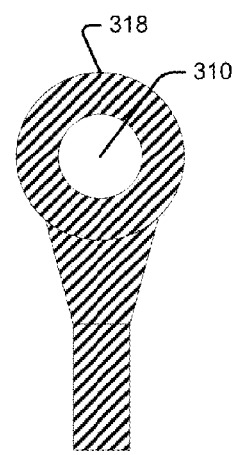

In response to detecting a force condition, at operation 615 the controller applies a voltage to actuate the rotation control assembly. In the embodiment depicted in FIGS. 3A to 3D the voltage is applied to the piezoelectric disk 316. Application of the voltage to the piezoelectric disk 316 causes the disk 316 to deform, expanding the piezoelectric disk as illustrated in FIG. 3D. Expansion of the piezoelectric disk 316 urges the brake 314 against the first collar 312A, generating friction which inhibits the rotation of the hinge assembly. If sufficient force is applied the rotation may be stopped completely, thereby locking the hinge assembly.

In some embodiments the opposing surfaces of the brake 314 and the first collar 312A may be impressed with a pattern such as teeth which interlock when the brake 314 is engaged with the first collar 312A such that the hinge assembly is effectively locked.

In some embodiments the control module 176 leaves the rotation control assembly actuated for a predetermined amount of time, e.g., a time between about 1 second and 60 seconds, and preferably between 1 second and 5 seconds. Thus, if, at operation 620, the predetermined amount of time has not elapsed the control module 176 continues to apply a voltage to the rotation control assembly. By contrast, if at operation 620 the predetermined amount of time has elapsed then control passes to operation 625 and the control module 176 terminates the voltage to the rotation control assembly. In the embodiment depicted in FIGS. 3A-3D terminating the voltage causes the piezoelectric disk 316 to revert to its original shape and the assembly reverts back to the configuration depicted in FIG. 3A, which allows free rotation of the hinge assembly. In some embodiments, the controller keeps the locking mechanism always engaged unless force is detected on the back of the display or at the edge of the display indicating that the user is attempting to adjust the screen angle or close the clamshell.

Figure 3E:
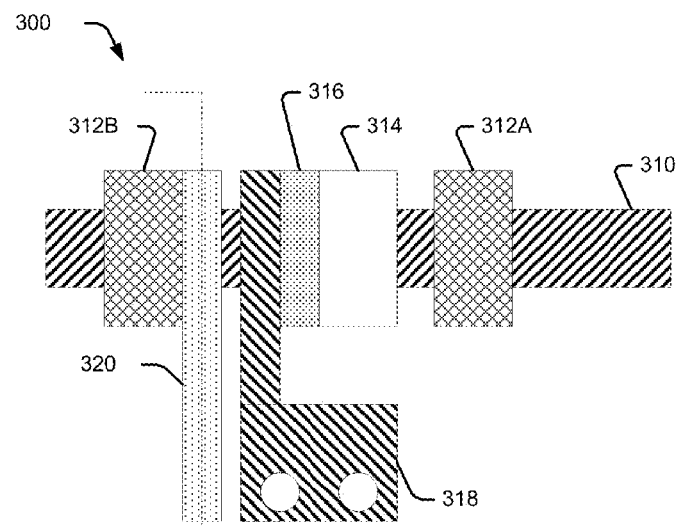
FIGS. 3E and 3G are schematic, top views
Figure 3F:
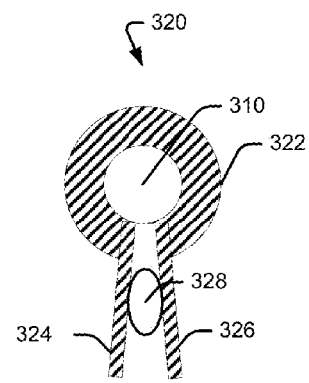
FIGS. 3F and 3H are schematic, cross-sectional views of a hinge locking assembly in accordance with some embodiments
Figure 3G:
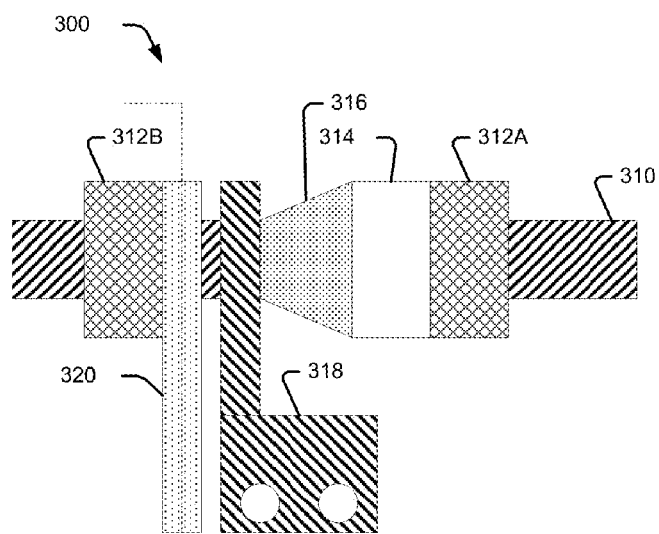
Figure 3H:
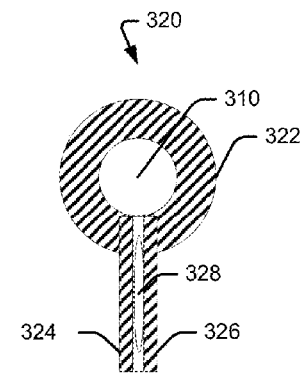
Figure 4A:
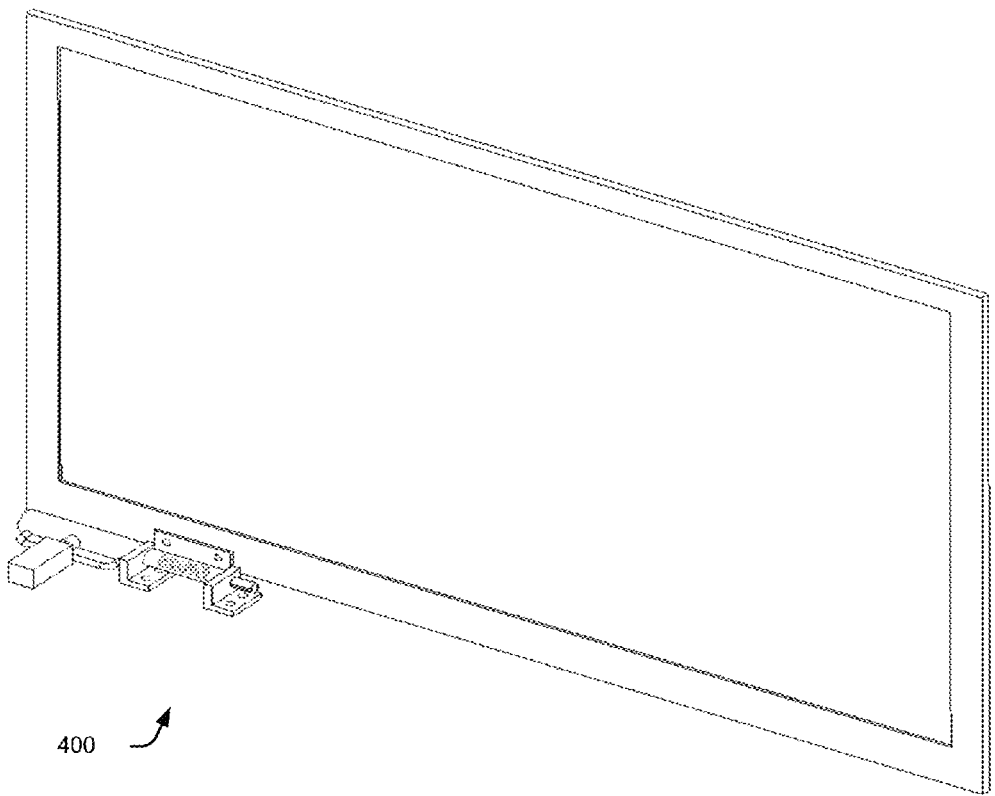
FIGS. 4A-4D are schematic illustrations of a hinge locking assembly in accordance with some embodiments.
Figure 4B:
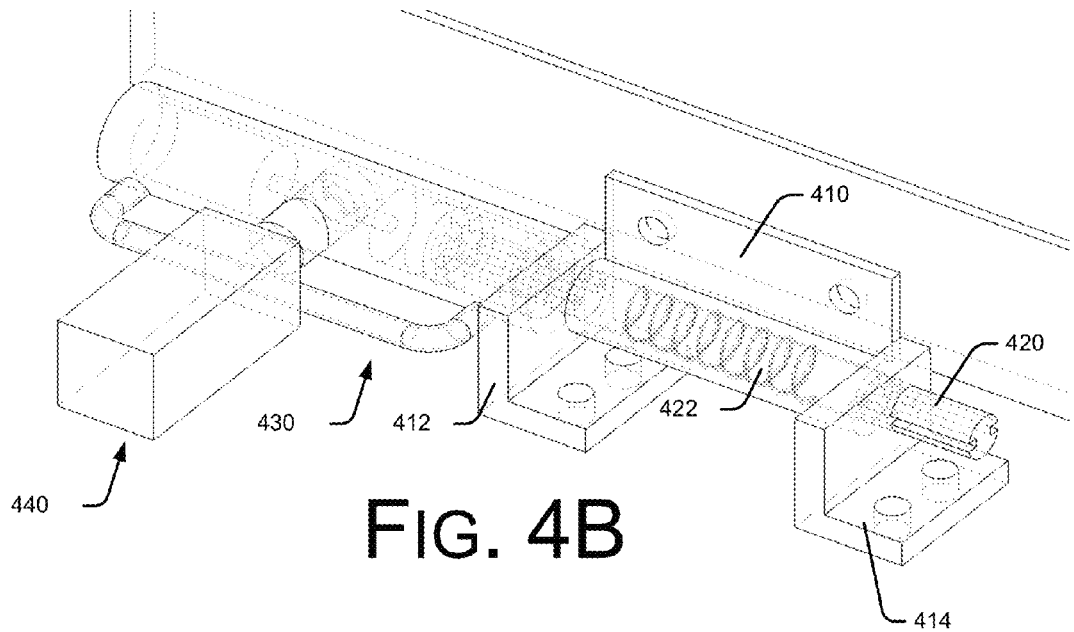
Figure 4C:
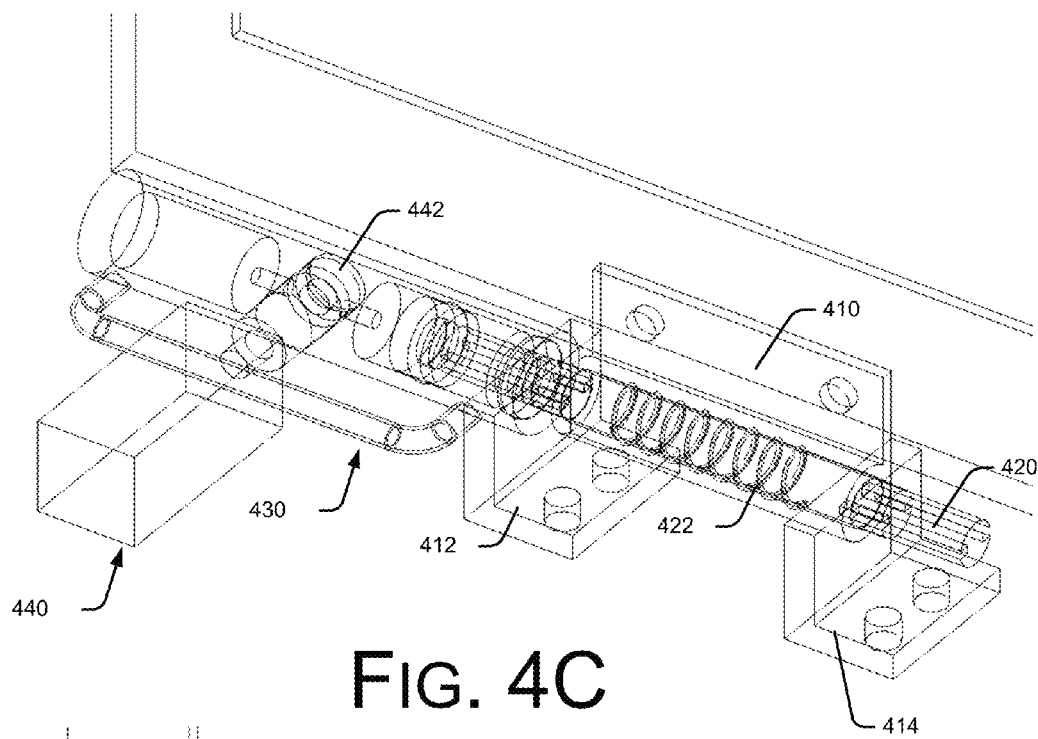
Figure 4D:
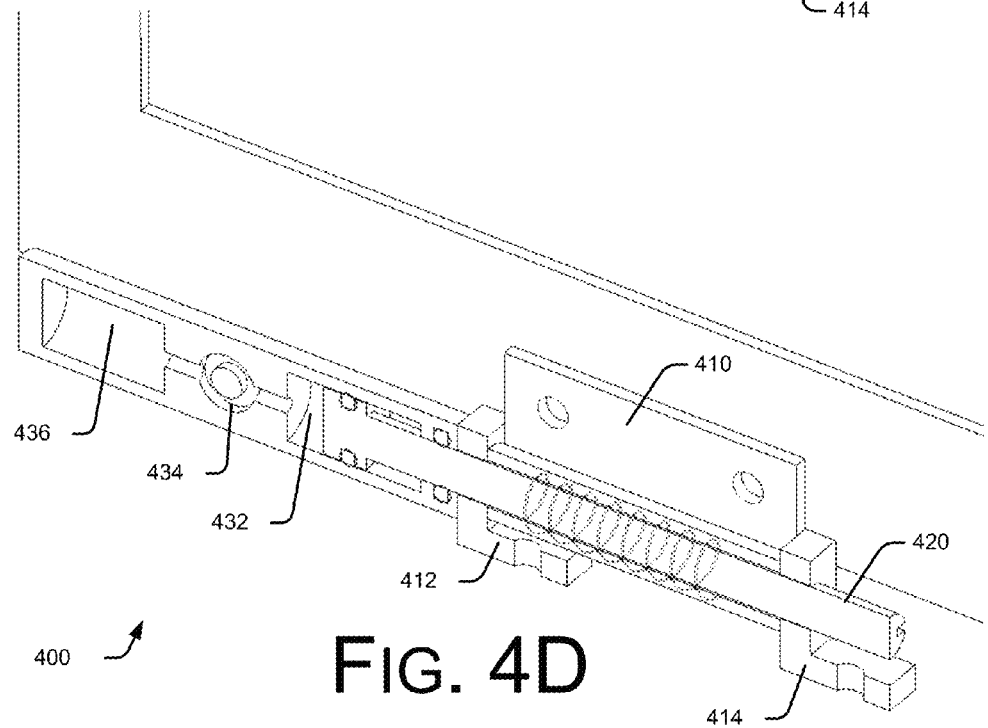

A further embodiment of a rotation control assembly 300 is illustrated in FIGS. 3E to 3H. The embodiment depicted in FIGS. 3E to 3H adds a second brake assembly 320 which is disposed proximate the second collar 312B. The second brake assembly 320 may be used in the place of or in conjunction with the first brake 314. Construction and operation of the second brake assembly 320 is depicted in FIGS. 3F and 3H. Referring first to FIG. 3F, the second brake assembly includes an annular ring 322 which surrounds the hinge pin 310 and a pair of opposing legs 324, 326 depending from the annular ring 322. A piezoelectric disk 328 is disposed between the legs 324, 326. When the rotation control assembly is in an unactuated state, as depicted in FIGS. 3E and 3F, the piezoelectric disk 328 forces the legs apart, which opens the annular ring 322, thereby allowing free rotation of the hinge pin 310 within the annular ring. By contrast, when the brake assembly 320 is actuated the piezoelectric disk 328 elongates, allowing the opposing legs 324, 326 to close such that the annular ring applies a frictional force to the hinge pin 310.

Another embodiment of a rotation control assembly 400 is depicted in FIGS. 4A to 4D. In overview, the embodiment depicted in FIGS. 4A to 4D utilizes a hinge pin which translates along a first axis in response to rotation of the hinge assembly. A hydraulic assembly is coupled to the hinge pin, such that translation of the hinge pin along the first axis forces fluid from a first chamber through a channel into a second chamber. A solenoid assembly coupled to the channel is moveable between a first position in which fluid flows freely through the channel and a second position in which fluid cannot flow through the channel.

Referring to FIGS. 4A to 4D, the rotation control assembly 400 may be mounted to a housing by brackets 410, 412, 414. A hinge ping 420 extends through brackets 412, 414. Hinge pin 420 comprises threads 422 and is keyed into brackets 412, 414 such that rotation of the hinge assembly causes the hinge pin 420 to translate along its longitudinal axis through the brackets.

The hinge pin 420 is coupled to a hydraulic assembly 430. The hydraulic assembly 430 comprises a first chamber 432 in fluid communication with a second chamber 436 via a channel 434. One end of the hinge pin 420 resides in the first chamber 432. Translation of the hinge pin 420 along its longitudinal axis in a direction toward the second chamber 436 forces fluid from the first chamber 432 into the second chamber 436 via the channel 434. Conversely, translation of the hinge pin 420 along its longitudinal axis in a direction away from the second chamber pulls fluid from the second chamber 436 into the first chamber 432 via the channel 434.

A solenoid assembly 440 is positioned such that the solenoid's plunger 442 is moveable between a first position in which the plunger 442 is adjacent, but outside the channel 434 and a second position in which the plunger 442 is disposed in the channel, thereby preventing fluid flow through the channel 434, which in turn prevents motion of the hinge assembly, effectively locking the assembly.

The assembly 400 may operate substantially in accordance with the operations depicted in FIG. 6, wherein application of the voltage at operation 615 acutates the solenoid assembly 440.

Another embodiment of a rotation control assembly 500 is depicted in FIGS. 5A to 5D. In overview, the embodiment depicted in FIGS. 5A to 5C utilizes a friction housing defining a shaft and a friction pin positioned within the friction housing. A solenoid assembly coupled to the friction pin to move the friction pin between a first position in which the friction pin rotates freely within the friction housing and a second position in which portions of the friction pin engage portions of the friction housing to inhibit rotation of the friction pin in the friction housing.

Figure 5A:
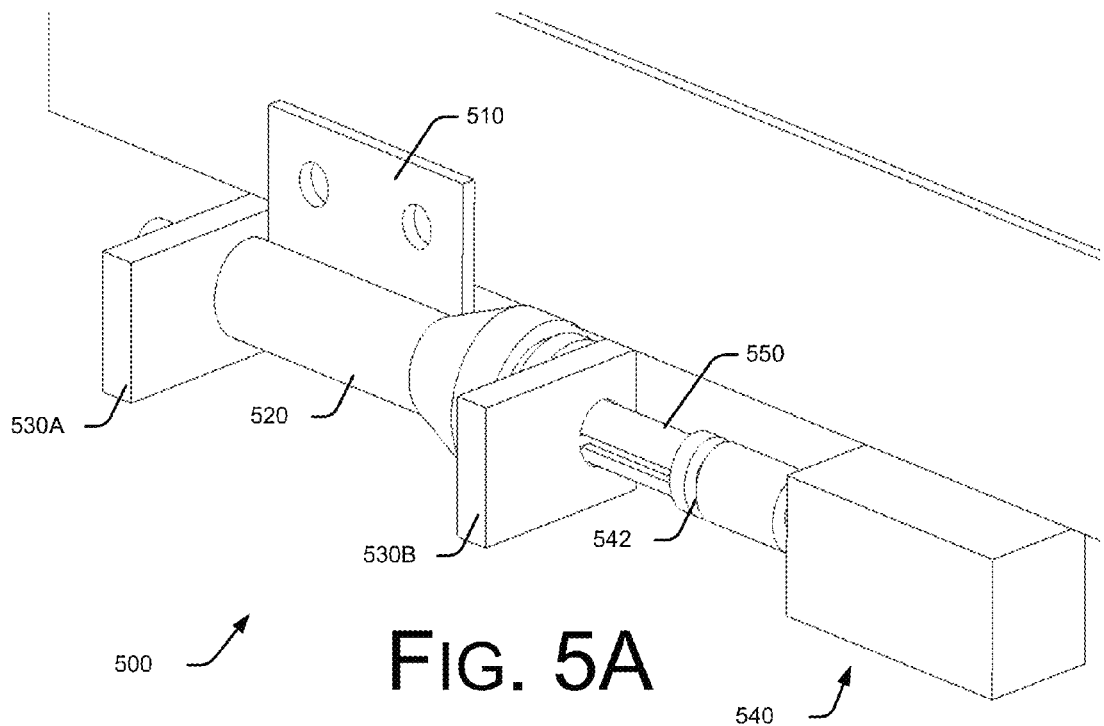
FIGS. 5A-5C are schematic illustrations of a hinge locking assembly in accordance with some embodiments.
Figure 5B:
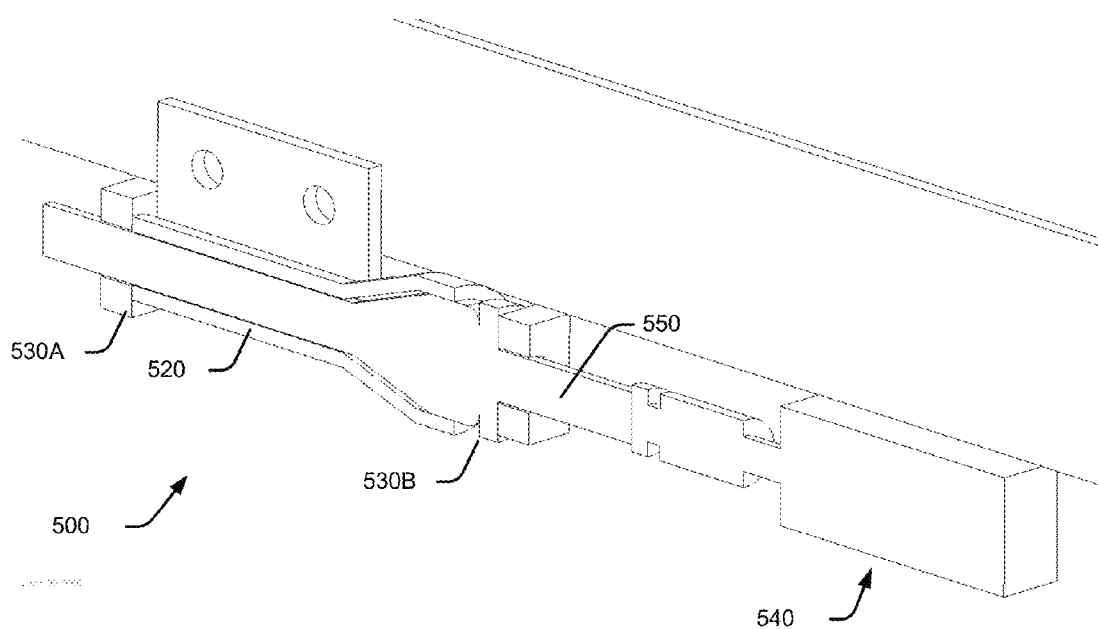
Figure 5C:
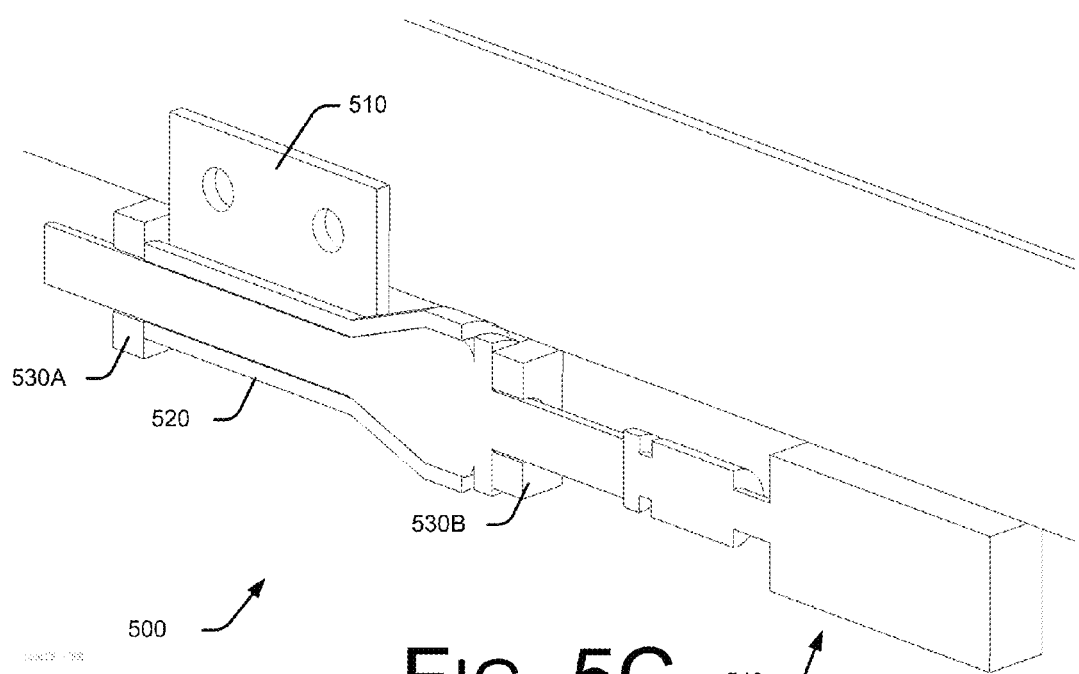

Referring to FIGS. 5A to 5C, the rotation control assembly 500 may be mounted to a housing by a bracket 510. A friction housing 520 is mounted between blocks 530A, 530B. A friction pin 550 is coupled to the plunger 542 of a solenoid assembly 540 and moveable within the shaft of the friction housing 520 between a first position (FIG. 5B) in which the friction pin can rotate freely in the shaft and a second position (FIG. 5C) in which the friction pin is engaged with the friction housing to inhibit rotation of the friction pin 550 relative to friction housing 520.

The assembly 500 may operate substantially in accordance with the operations depicted in FIG. 6, wherein application of the voltage at operation 615 acutates the solenoid assembly 540 to drive the friction pin into the friction housing 520.

Figure 7:
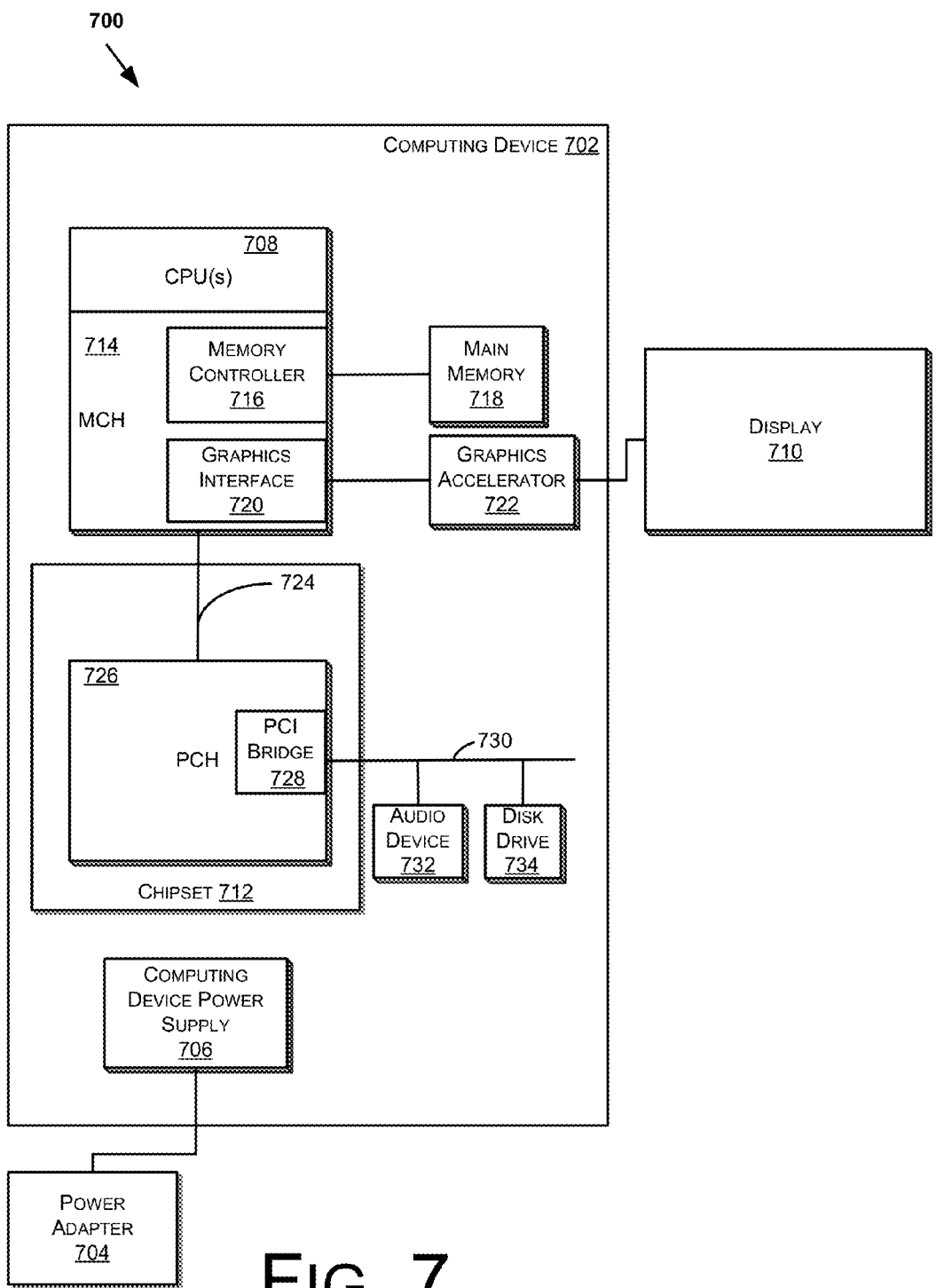
FIG. 7 is a schematic illustration of an exemplary electronic device which may be modified to include a locking hinge assembly in accordance with some embodiments.

As described above, in some embodiments the electronic device may be embodied as a computer system. FIG. 7 is a schematic illustration of a computer system 700 in accordance with some embodiments. The computer system 700 includes a computing device 702 and a power adapter 704 (e.g., to supply electrical power to the computing device 702). The computing device 702 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 702 (e.g., through a computing device power supply 706) from one or more of the following sources: one or more battery packs, an alternating current (AC) outlet (e.g., through a transformer and/or adaptor such as a power adapter 704), automotive power supplies, airplane power supplies, and the like. In some embodiments, the power adapter 704 may transform the power supply source output (e.g., the AC outlet voltage of about 110 VAC to 240 VAC) to a direct current (DC) voltage ranging between about 5 VDC to 12.6 VDC. Accordingly, the power adapter 704 may be an AC/DC adapter.

The computing device 702 may also include one or more central processing unit(s) (CPUs) 708. In some embodiments, the CPU 708 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON, and Celeron® processors. Also, one or more processors from other manufactures may be utilized. Moreover, the processors may have a single or multi core design.

A chipset 712 may be coupled to, or integrated with, CPU 708. The chipset 712 may include a memory control hub (MCH) 714. The MCH 714 may include a memory controller 716 that is coupled to a main system memory 718. The main system memory 718 stores data and sequences of instructions that are executed by the CPU 708, or any other device included in the system 700. In some embodiments, the main system memory 718 includes random access memory (RAM); however, the main system memory 718 may be implemented using other memory types such as dynamic RAM (DRAM), synchronous DRAM (SDRAM), and the like. Additional devices may also be coupled to the bus 710, such as multiple CPUs and/or multiple system memories.

The MCH 714 may also include a graphics interface 720 coupled to a graphics accelerator 722. In some embodiments, the graphics interface 720 is coupled to the graphics accelerator 722 via an accelerated graphics port (AGP). In some embodiments, a display (such as a flat panel display) 740 may be coupled to the graphics interface 720 through, for example, a signal converter that translates a digital representation of an image stored in a storage device such as video memory or system memory into display signals that are interpreted and displayed by the display. The display 740 signals produced by the display device may pass through various control devices before being interpreted by and subsequently displayed on the display.

A hub interface 724 couples the MCH 714 to an platform control hub (PCH) 726. The PCH 726 provides an interface to input/output (I/O) devices coupled to the computer system 700. The PCH 726 may be coupled to a peripheral component interconnect (PCI) bus. Hence, the PCH 726 includes a PCI bridge 728 that provides an interface to a PCI bus 730. The PCI bridge 728 provides a data path between the CPU 708 and peripheral devices. Additionally, other types of I/O interconnect topologies may be utilized such as the PCI Express architecture, available through Intel® Corporation of Santa Clara, Calif.

The PCI bus 730 may be coupled to an audio device 732 and one or more disk drive(s) 734. Other devices may be coupled to the PCI bus 730. In addition, the CPU 708 and the MCH 714 may be combined to form a single chip. Furthermore, the graphics accelerator 722 may be included within the MCH 714 in other embodiments.

Additionally, other peripherals coupled to the PCH 726 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 702 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus, comprising:
   a hinge assembly mountable to a first section of a housing of an electronic device;
   a rotation control assembly to control rotation of the hinge assembly; and
   a controller to activate the rotation control assembly in response to detection of a force condition at a second section of the housing of an electronic device, wherein:
   the rotation control assembly comprises a piezoelectric disk mounted on a shaft of the hinge assembly proximate a brake mounted on the shaft; and
   the controller is to apply a voltage to the piezoelectric disk in response to detection of a condition at a second section of the housing of an electronic device, wherein the voltage is to cause a portion of the piezoelectric disk to expand against the brake to control rotation of the hinge assembly.

2. The apparatus of claim 1, wherein at least one of opposing surfaces of the brake comprises teeth, such that expansion of the piezoelectric disk is to cause the teeth on the opposing surface to lock the hinge assembly in place.

3. The apparatus of claim 1, wherein:
   the rotation control assembly comprises
     a brake collar mounted on a shaft of the hinge assembly, the brake collar comprising an annular ring and a first leg and a second leg extending from the annular ring and defining a gap therebetween; and
     a piezoelectric disk disposed in the gap between the first leg and the second leg; and
   the controller is to apply a voltage to the piezoelectric disk in response to detection of a force condition at a second section of the housing of an electronic device wherein the voltage is to cause a portion of the piezoelectric disk to flatten to allow the brake to control rotation of the hinge assembly.

4. The apparatus of claim 1, wherein:
   the rotation control assembly comprises:
     a hinge pin translatable along a first axis in response to rotation of the hinge assembly; and
     a hydraulic assembly coupled to the hinge pin, such that translation of the hinge pin along the first axis is to allow fluid to flow from a first chamber through a channel into a second chamber; and
     a solenoid assembly coupled to the channel and moveable between a first position in which fluid is to flow through the channel to a second position in which fluid cannot flow through the channel; and
   the controller is to apply a voltage to the solenoid assembly in response to detection of a force condition at a second section of the housing of an electronic device.

5. The apparatus of claim 4, wherein:
   in response to the voltage, the solenoid assembly is to move from the first position to the second position for a predetermined period of time.

6. The apparatus of claim 1, wherein:
   the rotation control assembly comprises:
     a friction housing defining a shaft;
     a friction pin positioned within the friction housing; and
     a solenoid assembly coupled to the friction pin to move the friction pin between a first position in which the friction pin is to rotate freely within the friction housing and a second position in which at least one portion of the friction pin engages at least one portion of the friction housing to inhibit rotation of the friction pin in the friction housing; and the controller is to apply a voltage to the solenoid assembly in response to detection of a force condition at a second section of the housing of an electronic device.

7. The apparatus of claim 6, wherein:
in response to the voltage, the solenoid assembly is to move from the first position to the second position for a predetermined period of time.

8. The apparatus of claim 1, further comprising a detector assembly to detect a force condition at a second section of the housing.

9. The apparatus of claim 8, wherein the detector assembly comprises at least one of:
a touch screen;
a pressure sensor;
a proximity sensor;
a stereoscopic camera assembly;
a structured light camera assembly;
a time of flight camera assembly; or
a video input.

10. An electronic device, comprising:
a housing having a first section and a second section comprising a display, the second section coupled to the first section by a hinge assembly;
a rotation control assembly to control rotation of the hinge assembly; and
a controller to activate the rotation control assembly in response to detection of a force condition at a second section of the housing of an electronic device, wherein:
the rotation control assembly comprises a piezoelectric disk mounted on a shaft of the hinge assembly proximate a brake mounted on the shaft; and
the controller is to apply a voltage to the piezoelectric disk in response to detection of a condition at a second section of the housing of an electronic device, wherein the voltage is to cause a portion of the piezoelectric disk to expand against the brake to control rotation of the hinge assembly.

11. The electronic device of claim 10, wherein at least one of opposing surfaces of the brake comprises teeth, such that expansion of the piezoelectric disk is to cause the teeth on the opposing surface to lock the hinge assembly in place.

12. The electronic device of claim 10, wherein:
the rotation control assembly comprises
a brake collar mounted on a shaft of the hinge assembly, the brake collar comprising an annular ring and a first leg and a second leg extending from the annular ring and defining a gap there between; and
a piezoelectric disk disposed in the gap between the first leg and the second leg; and
the controller is to apply a voltage to the piezoelectric disk in response to detection of a force condition at a second section of the housing of an electronic device wherein the voltage is to cause a portion of the piezoelectric disk to flatten to allow the brake to control rotation of the hinge assembly.

13. The electronic device of claim 10, wherein:
the rotation control assembly comprises:
a hinge pin translatable along a first axis in response to rotation of the hinge assembly; and
a hydraulic assembly coupled to the hinge pin, such that translation of the hinge pin along the first axis is to allow fluid to flow from a first chamber through a channel into a second chamber; and
a solenoid assembly coupled to the channel and moveable between a first position in which fluid is to flow through the channel to a second position in which fluid cannot flow through the channel; and
the controller is to apply a voltage to the solenoid assembly in response to detection of a force condition at a second section of the housing of an electronic device.

14. The electronic device of claim 13, wherein:
in response to the voltage, the solenoid assembly is to move from the first position to the second position for a predetermined period of time.

15. The electronic device of claim 10, wherein:
the rotation control assembly comprises:
a friction housing defining a shaft;
a friction pin positioned within the friction housing; and
a solenoid assembly coupled to the friction pin to move the friction pin between a first position in which the friction pin is to rotate freely within the friction housing and a second position in which at least one portion of the friction pin engages at least one portion of the friction housing to inhibit rotation of the friction pin in the friction housing; and
the controller is to apply a voltage to the solenoid assembly in response to detection of a force condition at a second section of the housing of an electronic device.

16. The electronic device of claim 15, wherein:
in response to the voltage, the solenoid assembly is to move from the first position to the second position for a predetermined period of time.

17. The electronic device of claim 10, further comprising a detector assembly to detect a force condition at a second section of the housing.

18. The electronic device of claim 17, wherein the detector assembly comprises at least one of:
a touch screen;
a pressure sensor;
a proximity sensor;
a stereoscopic camera assembly;
a structured light camera assembly;
a time of flight camera assembly; or
a video input.

* * * * *